United States Patent [19]
Schaal et al.

[11] Patent Number: 5,514,193
[45] Date of Patent: May 7, 1996

[54] AIR HUMIDIFIER

[75] Inventors: Gerd-Eugen Schaal, Stuttgart; Paul Wenger, Ditzingen; Klaus Günther, Leonberg, all of Germany

[73] Assignee: LTG Lufttechnische Gesellschaft mit beschränkter Haftung, Stuttgart, Germany

[21] Appl. No.: 115,287

[22] Filed: Aug. 31, 1993

[30]    Foreign Application Priority Data

Sep. 2, 1992 [DE] Germany ............... 42 29 171.2

[51] Int. Cl.$^6$ ................................. B01D 45/08
[52] U.S. Cl. ................................. 55/257.2; 55/440
[58] Field of Search ................. 55/257.2, 440, 55/241

[56]          References Cited

U.S. PATENT DOCUMENTS

| | | | |
|---|---|---|---|
| 1,452,204 | 4/1923 | Luetscher | 55/440 |
| 1,554,185 | 9/1925 | Preble | 55/257.2 |
| 1,896,656 | 2/1933 | Anderson | 55/440 |
| 2,066,832 | 1/1937 | Gay | 55/440 |
| 2,237,482 | 4/1941 | Faber | 55/241 |
| 3,550,357 | 12/1970 | Bowen et al. | 55/440 |
| 4,308,222 | 12/1981 | Goettl et al. | 55/257.2 |

FOREIGN PATENT DOCUMENTS

| | | | |
|---|---|---|---|
| 2619688 | 12/1977 | Germany | 55/440 |
| 246963 | 4/1970 | U.S.S.R. | 55/440 |
| 0709131 | 1/1980 | U.S.S.R. | 55/440 |
| 2092471 | 8/1982 | United Kingdom | 55/440 |

*Primary Examiner*—Tim Miles
*Attorney, Agent, or Firm*—Anderson Kill Olick & Oshinsky

[57]          ABSTRACT

An air humidifier includes a chamber through which a stream of air flows, a liquid atomizing device arranged in the chamber for humidifying the air flowing through the chamber, and an adjustable water separator located downstream of the atomizing device for separating excess water drops from the humidified air in accordance with predetermined humidification parameters.

6 Claims, 9 Drawing Sheets

AIR HUMIDIFIER

BACKGROUND OF THE DESCRIPTION

The invention is directed to an air humidifier with a humidifying device, through which passes a flow of air to be humidified and whose humidifying action can be adjusted by changing the humidification parameters, and with a liquid separator, particularly a water separator, for separating excess drops from the humidified air flow.

The use of air humidifiers in ventilating and air-conditioning installations or the like is known. These air humidifiers are also known as "washers" and operate in a ventilation installation (for example, the ventilating or air-conditioning installation mentioned above) according to the following principle: a flow of air is fed to the air humidifier by means of an air delivery installation (e.g. a ventilator). The air flow is humidified with a liquid, in particular with water, preferably prepared water, in a chamber of the air humidifier. This chamber can be constructed as a nozzle chamber. It has a plurality of atomizing nozzles for atomizing the liquid. This is preferably effected in or opposite to the direction of the flow of air. The water drops forming as a result of the atomization arc entrained by the flow of air and in so doing are completely or partially evaporated. The rate of evaporation depends on the size of the drops and on the relative speed of the water drops and air as well as on other parameters. In order to achieve the highest possible humidifying output (ideally, the air is humidified to 100% relative humidity and, it, possible, oversaturated) with the shortest possible flow path—which corresponds to a short constructional length of the device—considerably more water is atomized into the air than is needed for humidifying. In known installations, roughly ten to one hundred times the amount of water is used. The excess water must be separated from the air flow again so that the air downstream of the washers has 100% relative humidity without containing free drops of water. Residual free, large drops of water would lead to a humidifying of subsequent devices of the ventilation installation, which is undesirable. The spectrum of drops, with respect to the size of the individual drops, depends on the geometric formation of the atomizing nozzle and also on the pressure with which the liquid (in particular water) is atomized. The greater the pressure, the finer (smaller) the drops of the drop spectrum which is produced. This is advantageous for the mass transfer between the liquid and the air to be humidified, but is disadvantageous for the separation of the excess drops which must be carried out subsequently, since small drops are only inadequately separated by the known liquid separators. For this reason, the liquid atomizing devices used in the known devices do not have a drop spectrum in which the size of the drops is too small.

The present invention therefore has the object of providing an air humidifier of the type mentioned above which achieves a higher humidifying efficiency through the use of only a small amount of water.

SUMMARY OF THE INVENTION

This object is met, according to the invention, in that the degree of separation of the moisture separator is adjusted as a function of the humidification parameters. As a result of this step, it is possible, depending on the existing humidifying output, in particular with respect to the existing drop spectrum, to adjust the liquid separator in such a way that the excess drops are separated from the humidified air in an optimal manner. Consequently, excellent conditions can be provided for an effective mass transfer, while the invention nevertheless ensures that the excess liquid is separated so that the ventilating devices located downstream remain dry. The degree of separation of the moisture separator can be adjusted either manually or, according to another embodiment example of the invention, automatically as a function of the humidification parameters of the humidifying device. In the latter case, corresponding sensors are capable of detecting the humidification parameters. The sensors transmit the humidification parameters to a control unit or regulating device which controls the liquid separator.

It is advantageous in particular when—as already mentioned—the degree of separation is varied with respect to the drop sizes to be separated.

According to a further development of the invention, the humidifying device as already mentioned—is a liquid atomizing device which atomizes different drop spectra as a function of the humidification parameters, and the degree of separation of the moisture separator is adjusted as a function of the drop spectra in question.

In a particularly advantageous manner, the moisture separator has lamellar or rib walls which cause a deflection of the flow of air so that the excess drops are thrown against the regions of the rib walls and are accordingly separated. The moisture separator accordingly works according to the principle of centrifugal force. This is also known as a "centrifugal separator". Due to the deflection of the humidified air flow, the free drops contained therein are thrown against the regions of the rib walls and thus settle on these regions and flow into a collecting receptacle. They can then be returned to the process, i.e. the liquid can be atomized again by means of the liquid atomizing device.

The positions of the rib walls or the positions of portions of the rib walls can preferably be changed to adjust the degree of separation.

According to an embodiment example, the rib walls or portions thereof are adjusted as a function of the atomizing pressure of the liquid atomizing device. If the atomizing pressure is set very high resulting in a high-pressure atomization—which is particularly important according to the invention—this produces a liquid spectrum with extremely small drop sizes. These vex), small drops have a very positive effect on the mass transfer, i.e. with respect to the evaporation, so that the air flow can be humidified with a relatively small amount of water. On the other hand, the construction of the moisture separator according to the invention nevertheless ensures that the very small drops can also be separated in the moisture separator so that 100% relative humidity can be achieved without generating unwanted large, free drops of water. Moreover, according to the invention, it is possible to adjust the degree of separation of the moisture separator in such a way that the very smallest drops can pass through the moisture separator so that they are evaporated and absorbed by the air flow in the subsequent regions of the ventilation installation without resulting in impermissible precipitation of moisture.

According to a further development of the invention, at least one of the rib walls—as seen in the direction of the air flow—is formed from a plurality of portions which, for the purpose of adjusting the degree of separation, are flexibly coupled with one another and can be displaced relative to one another so as to increase the angles of the air deflection. The angles of the air deflection can be decreased in a corresponding manner when these portions are drawn apart. By pushing the portions together, the labyrinth path formed by the rib walls is increased with respect to the angles of the air deflection resulting in proportionately greater centrifugal forces so that even very small drops are separated. Within the scope of the present application, "air deflection" refers to a change in the direction of flow by optional selection of the deflection angle. When it is not necessary to separate such small drops, the angles of the air deflection can be smaller, which is achieved by spreading apart the portions of the rib walls, since the bends in the labyrinth path are then less sharp.

In addition or alternatively, the rib walls may be formed by at least two partial walls of roughly identical contour which contact one another in a basic position and can be spread apart, in particular at an angle relative to one another, for adjusting the degree of separation. The two partial walls of a rib wall are preferably coupled with one another via a hinge or the like by way of their ends facing the flow of air and can be spread apart in a V-shaped manner to adjust the degree of separation.

In addition or alternatively, another embodiment form offers the possibility of outfitting the rib walls with foldable air flow displacement members for adjusting the degree of separation. The extent to which these air flow displacement members are spread apart from the rib wall determines the intensity of a whirling of the air and accordingly a change in the centrifugal force.

BRIEF DESCRIPTION OF THE DRAWINGS

The present invention will now be described in more detail with reference to the appended drawings, wherein.

DETAILED DESCRIPTION OF THE PREFERRED EMBODIMENTS

Figure 1:
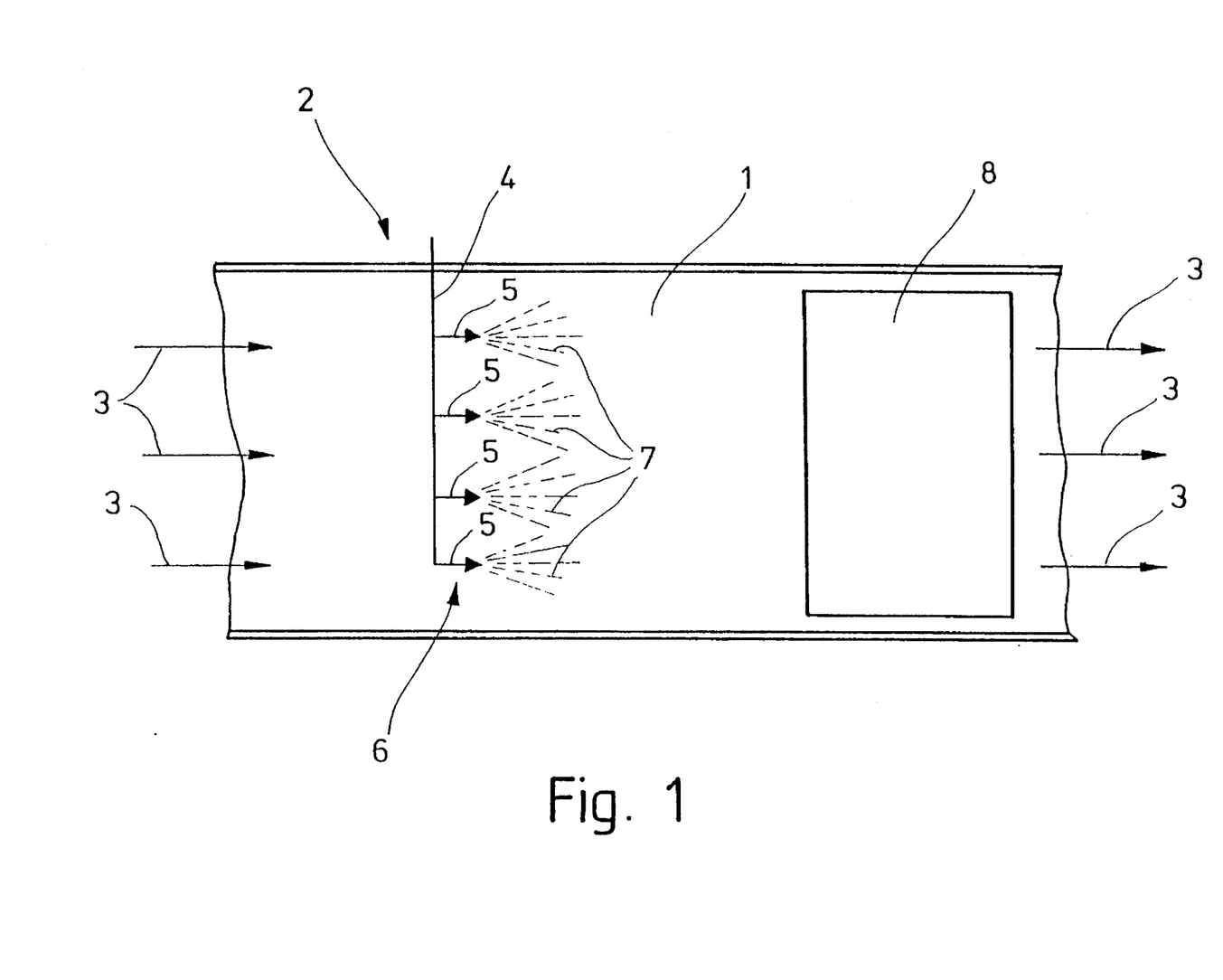
FIG. 1 shows a schematic view of a section through a nozzle chamber of an air humidifier with a moisture separator according to the present invention.

FIG. 1 is a schematic view of a longitudinal section through a nozzle chamber 1 of an air humidifier 2. The air humidifier 2 is part of a ventilation device which is not shown in greater detail in FIG. 1. Rather, FIG. 1 shows only a portion of the overall arrangement. A flow of air 3 is fed to the nozzle chamber 1 by a conveying device (for example, a ventilator) which is not shown in the drawing. A high-pressure pipeline network 4 is arranged in the nozzle chamber 1. Atomizing nozzles 5 of a liquid atomizing device 6 which are in a planar matrix arrangement are connected to this high-pressure pipeline network 4. The atomizing nozzles 5 are fed by means of a high-pressure pump, not shown in the drawing. The delivery pressure of the high-pressure pump, and accordingly the amount of liquid pumped by it, can be regulated or controlled. When in operation, each atomizing nozzle 5 forms a liquid atomizing cone 7 which lies in the direction of the flow of air 3. The atomized liquid humidifying the supplied air flow 3 is preferably water, particularly prepared water.

A moisture separator 8 constructed as a water separator is arranged downstream of the liquid atomizing device 6. According to FIGS. 2 to 9, the water separator has rib walls 9 which cause a deflection of the humidified air flow 3 so that excess drops located in the air flow 3 are thrown against regions of the rib walls 9 and are accordingly separated. In order to achieve the shortest possible constructional length of the nozzle chamber 1, the liquid atomizing device 6 supplies a quantity of water to the air flow 3 which is substantially more than is required to achieve a relative humidity of preferably 100%. In the device according to the invention, however, the amount of water supplied is substantially less than that in devices of the prior art. The water separator works in such a way that it extracts excess drops from the air flow 3 so that the air flow 3 reaching subsequent devices in the ventilation installation has 100% relative humidity but no longer contains any free drops of water of impermissible size. Only the smallest drops of water which evaporate with the continued guidance of the air flow and contribute to a very high air humidity are allowed, but no precipitation of moisture occurs.

Figure 2:
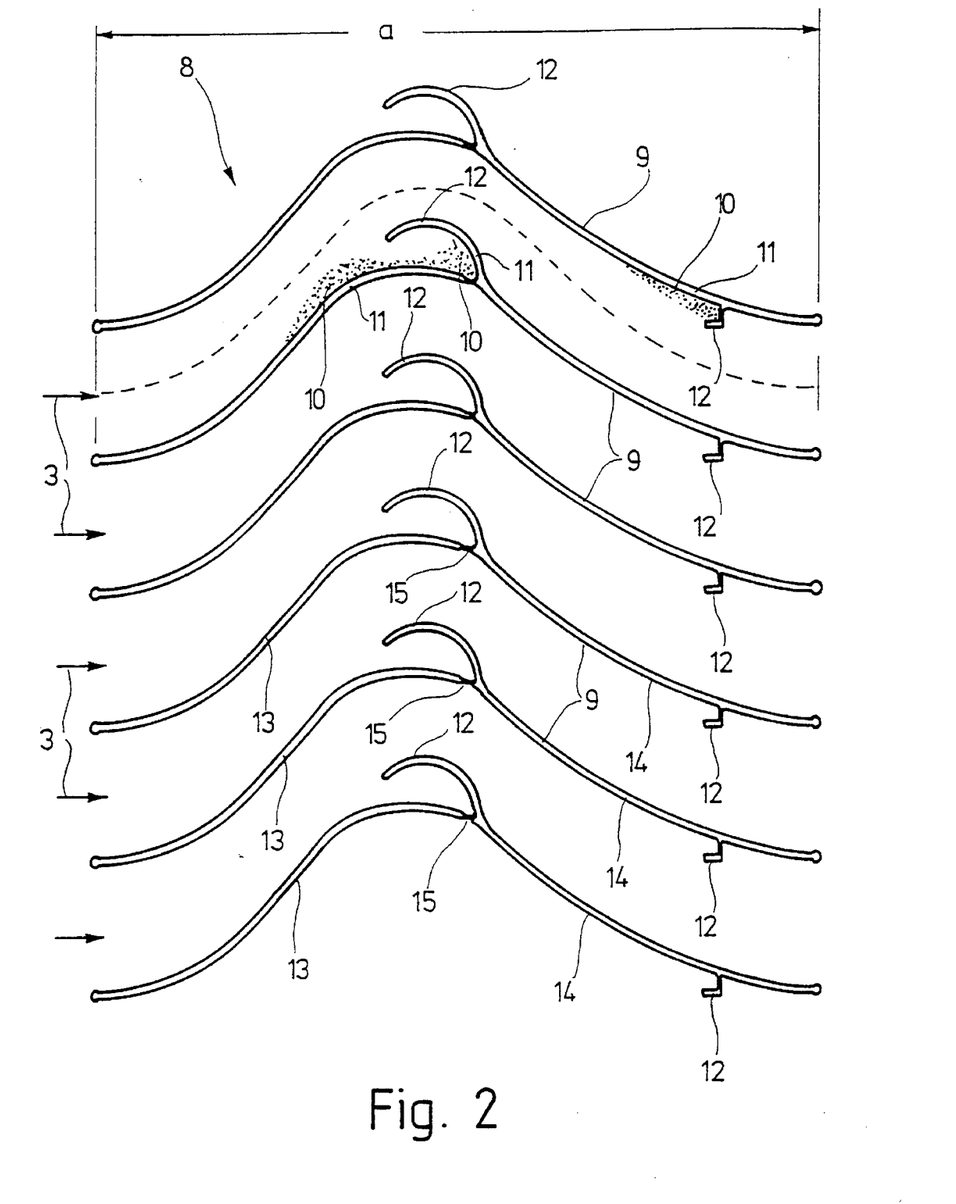
FIG. 2 shows a first embodiment of a moisture separator according to the present invention in a first position thereof corresponding to a first degree of separation of water drops which defines the size of separated water drops.
Figure 3:
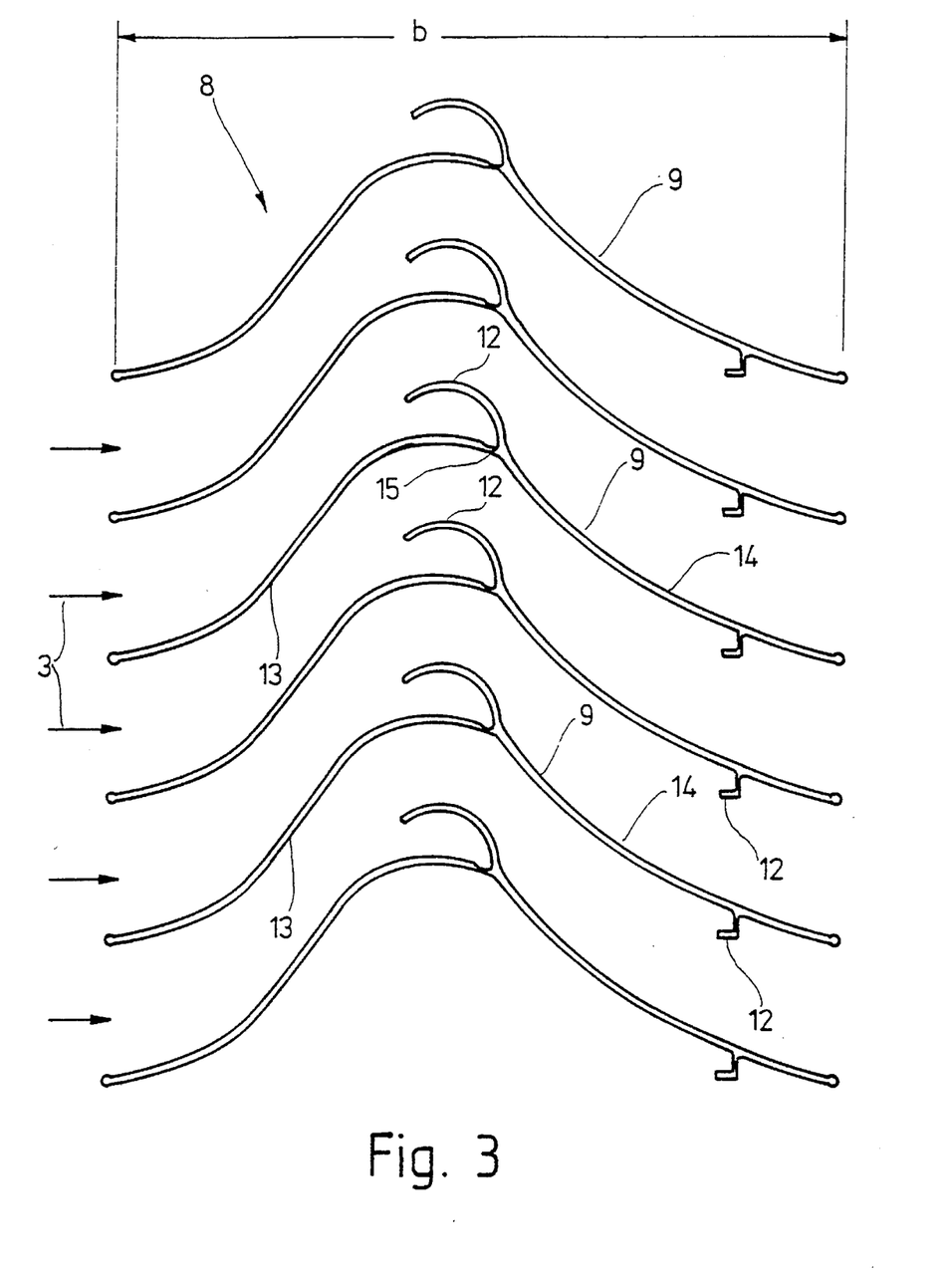
FIG. 3 shows the first embodiment of the moisture separator in a second position thereof corresponding to a second degree of separation of water drops.
Figure 4:
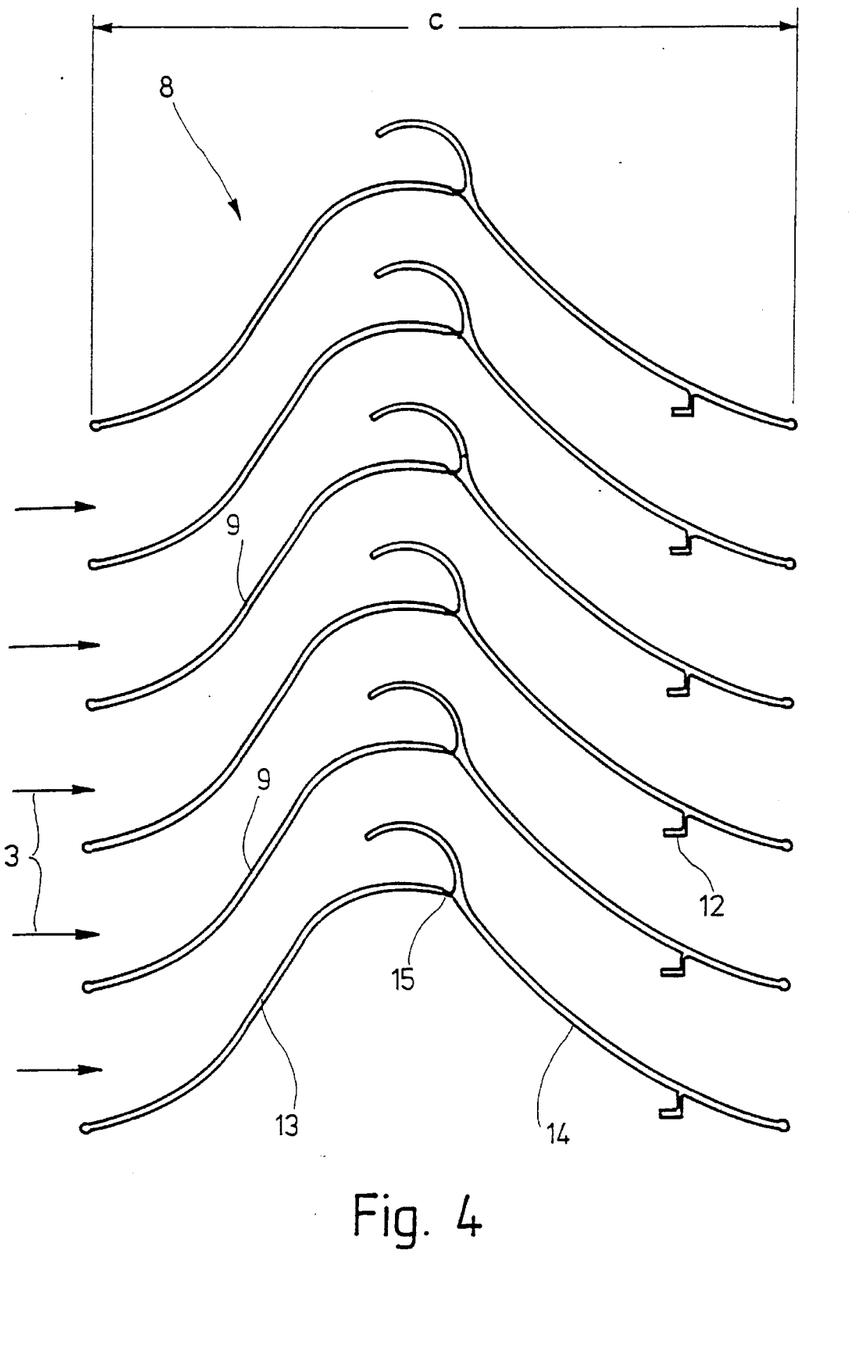
FIG. 4 shows the first embodiment of the moisture separator in a third position thereof corresponding to a third degree of separation of water drops.

The embodiment examples in FIGS. 2 to 4 show rib walls 9 of a moisture separator 8 which extend in a wavy manner. The individual rib walls 9 lie at a distance from one another so that the air 3 flowing between them passes along a labyrinth path. The deflection of the air flow 3 due to the wavy shape causes free drops 10 in the air flow 3 to be thrown against the curved inner surfaces, i.e. they are separated at regions 11 of the rib walls 9, collected at these regions 11, and returned to the liquid atomizing device 6. Displacement webs 12 are arranged at the rib walls 9 so as to form hollow spaces acting as water run-off channels. The drops 10 preferably collect in these hollow spaces. In FIGS. 2 to 9, the air flow path is indicated only once in the region between two rib walls 9. The free drops 10 are also only shown there. Of course, the air is deflected and the drops are collected at each of the rib walls, but, for the sake of simplicity, this is not shown.

FIG. 2 shows that each rib wall 9 is formed from two portions 13 and 14 which are flexibly connected with one another at an articulation point 15. These two portions 13 and 14 of each rib wall 9 can be moved toward one another by means of an appropriate adjusting device, not shown, so that the distance a shown in FIG. 2 is shortened to distance b or c in FIGS. 3 and 4, where a>b>c. This increases the angles of the air deflection, thus changing the degree of separation of the moisture separator 8. This change is effected in particular with respect to the size of the drops to be separated. The greater the angles of the air deflection, the smaller the drops which are separated.

Figure 5:
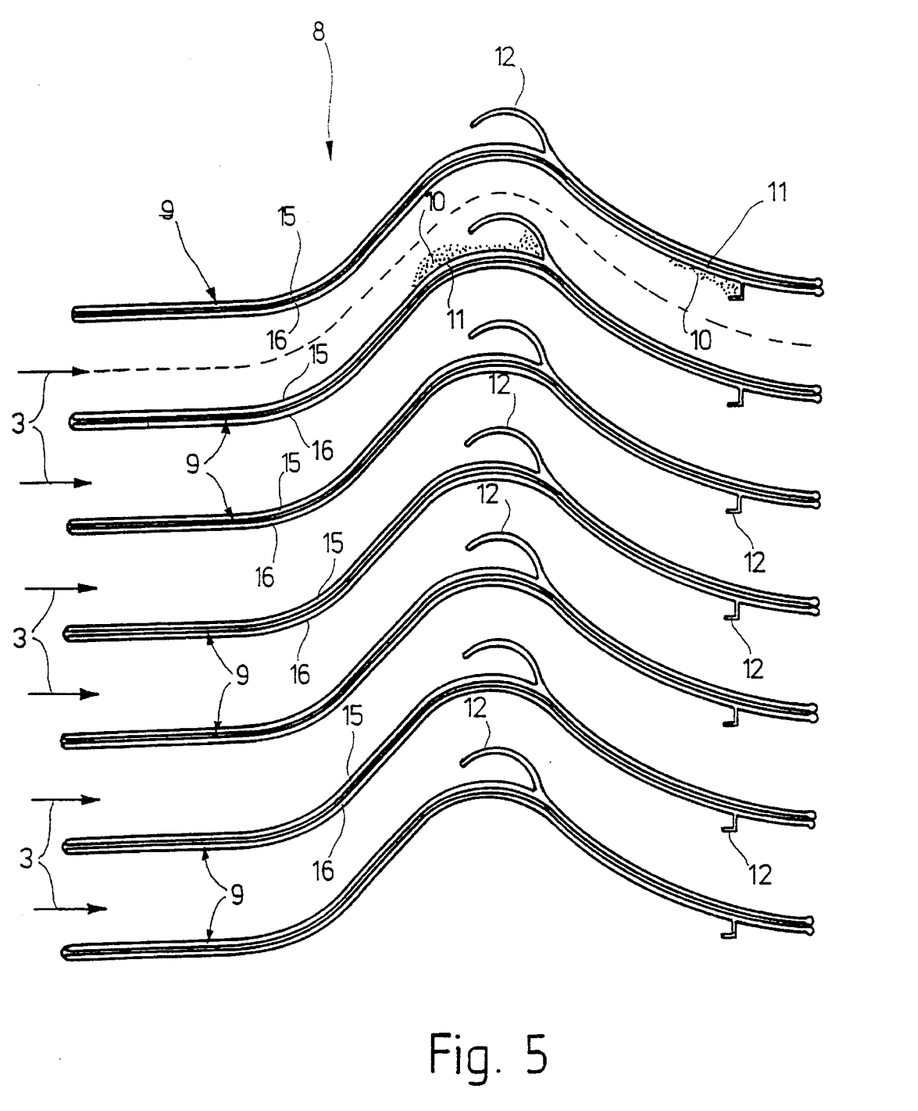
FIG. 5 shows a second embodiment of a moisture separator according to the present invention in a first position thereof.
Figure 6:
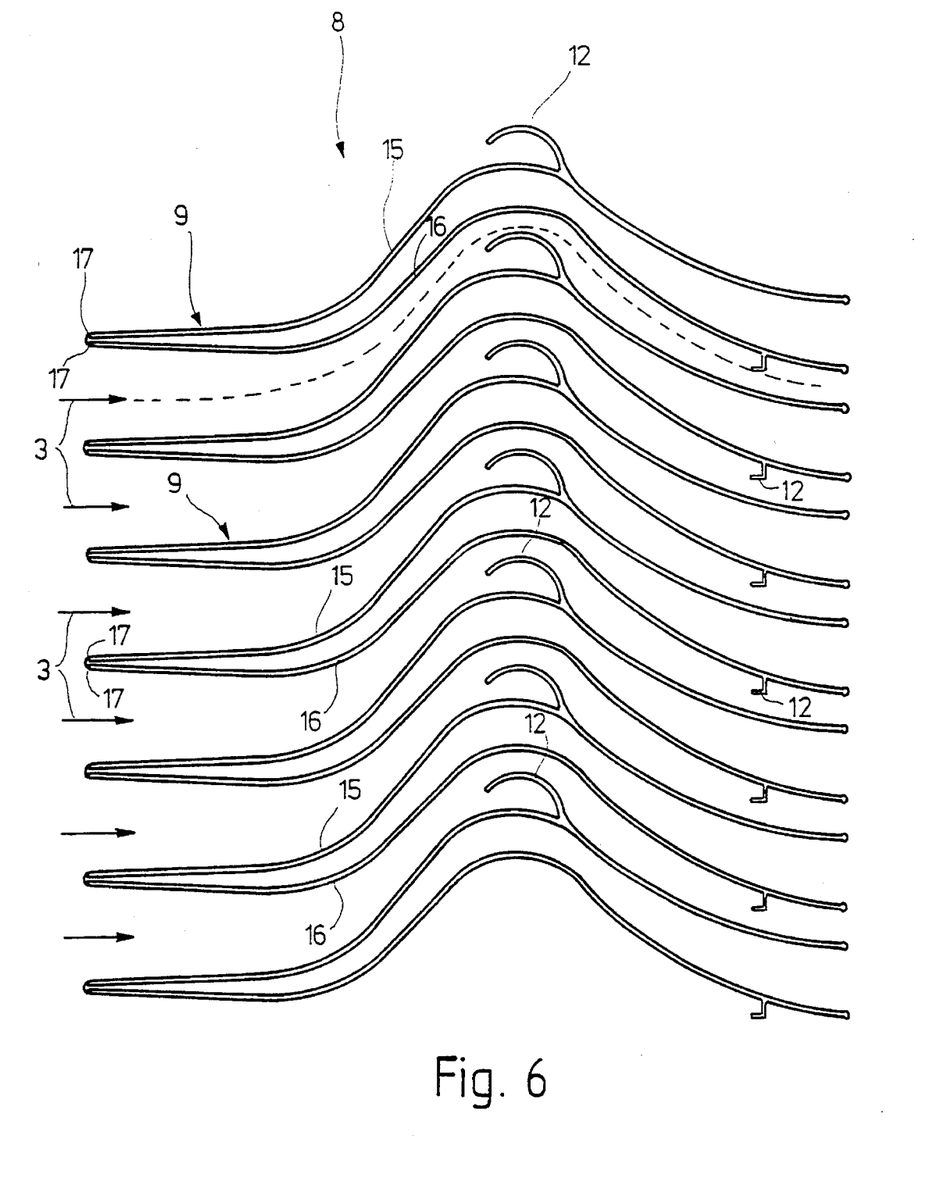
FIG. 6 shows the second embodiment of a moisture separator in a second position thereof.

FIGS. 5 and 6 show another embodiment example of a moisture separator 8 in which the rib walls 9 are formed from two partial walls 15 and 16 which contact one another in a basic position (FIG. 5). The two partial walls 15 and 16 have the same wavy contour. The individual rib walls 9 formed by the partial walls 15 and 16 are arranged at uniform distances from one another so that a corresponding deflection of the air flow 3 is effected between them. As in the embodiment example described above, displacement webs 12 are arranged at the partial walls 15 and 16.

A comparison of FIGS. 5 and 6 shows that the two partial walls 15 and 16 of each rib wall 9 can be spread apart in such a way that they extend toward one another at an angle. For this purpose, they are flexibly connected with one another at their ends facing in the direction opposite to the air flow 3. By spreading apart the partial walls 15 and 16, the air deflection path is changed. On the one hand, it becomes narrower; on the other hand, it has a greater air deflection angle. The farther the partial walls 15 and 16 are spread apart, the smaller the drops of the drop spectrum entrained by the air flow 3 which are separated.

Figure 7:
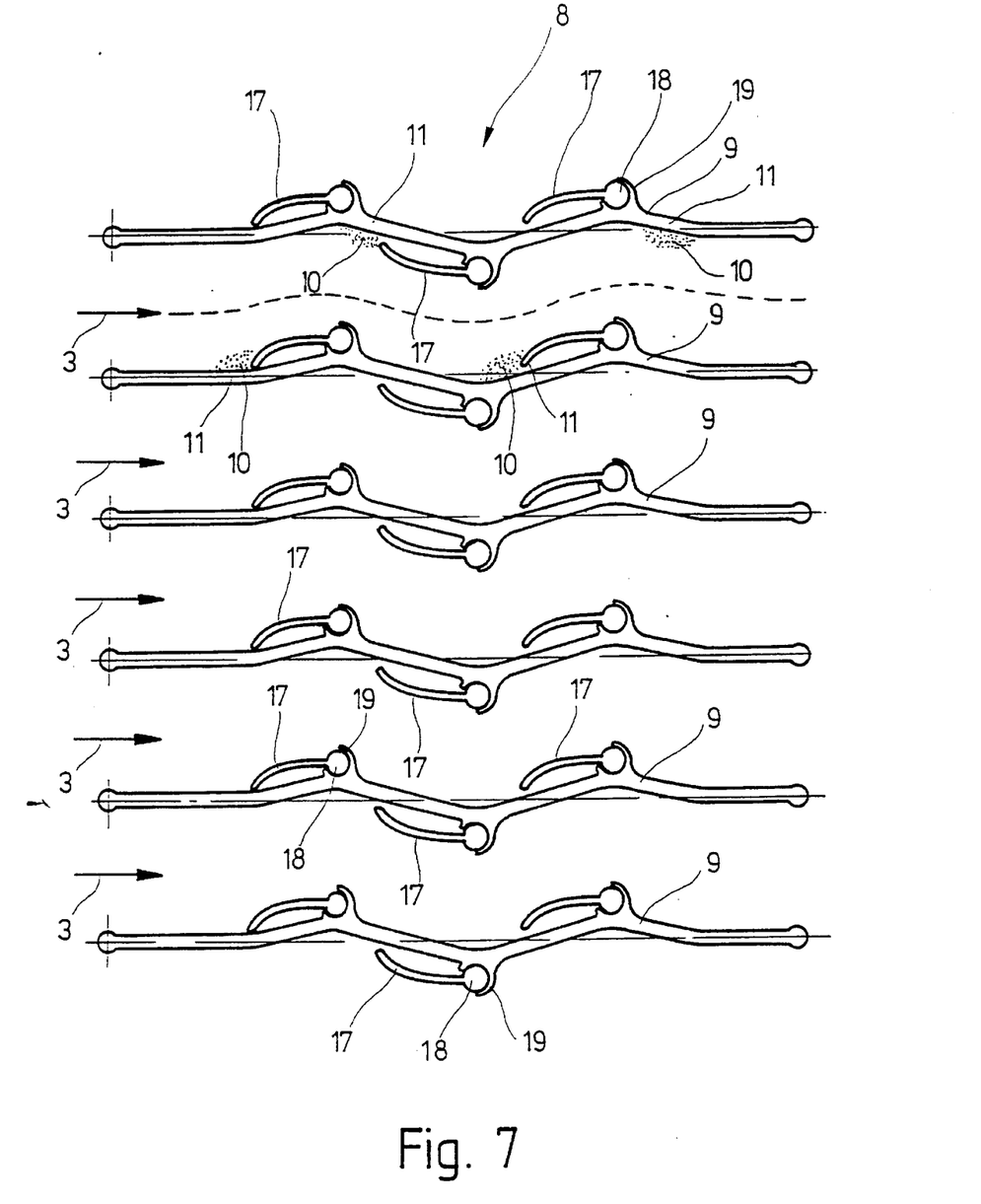
FIG. 7 shows a third embodiment of a moisture separator according to the present invention in a first position thereof.
Figure 8:
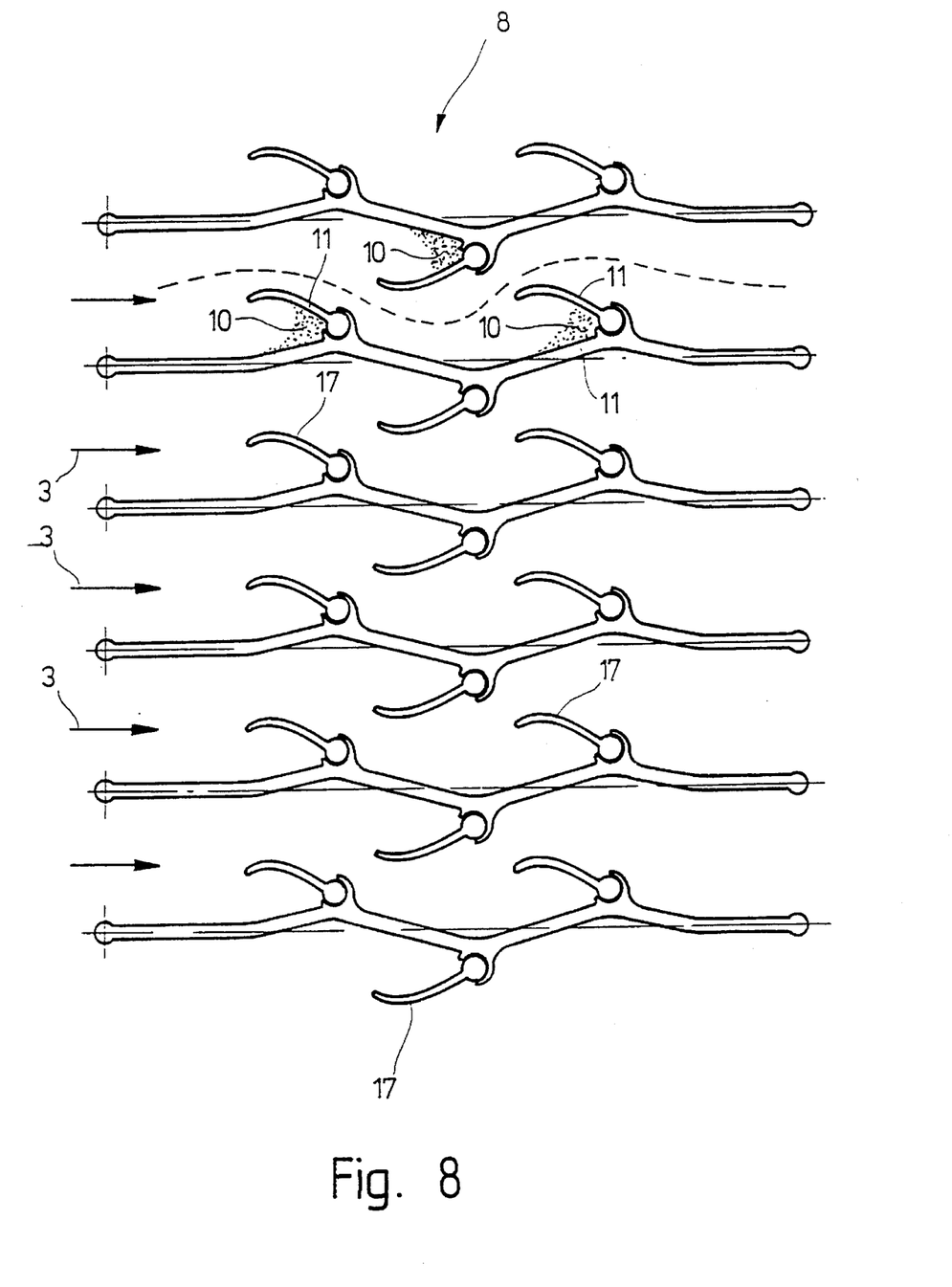
FIG. 8 shows the third embodiment of the moisture separator in a second position thereof.
Figure 9:
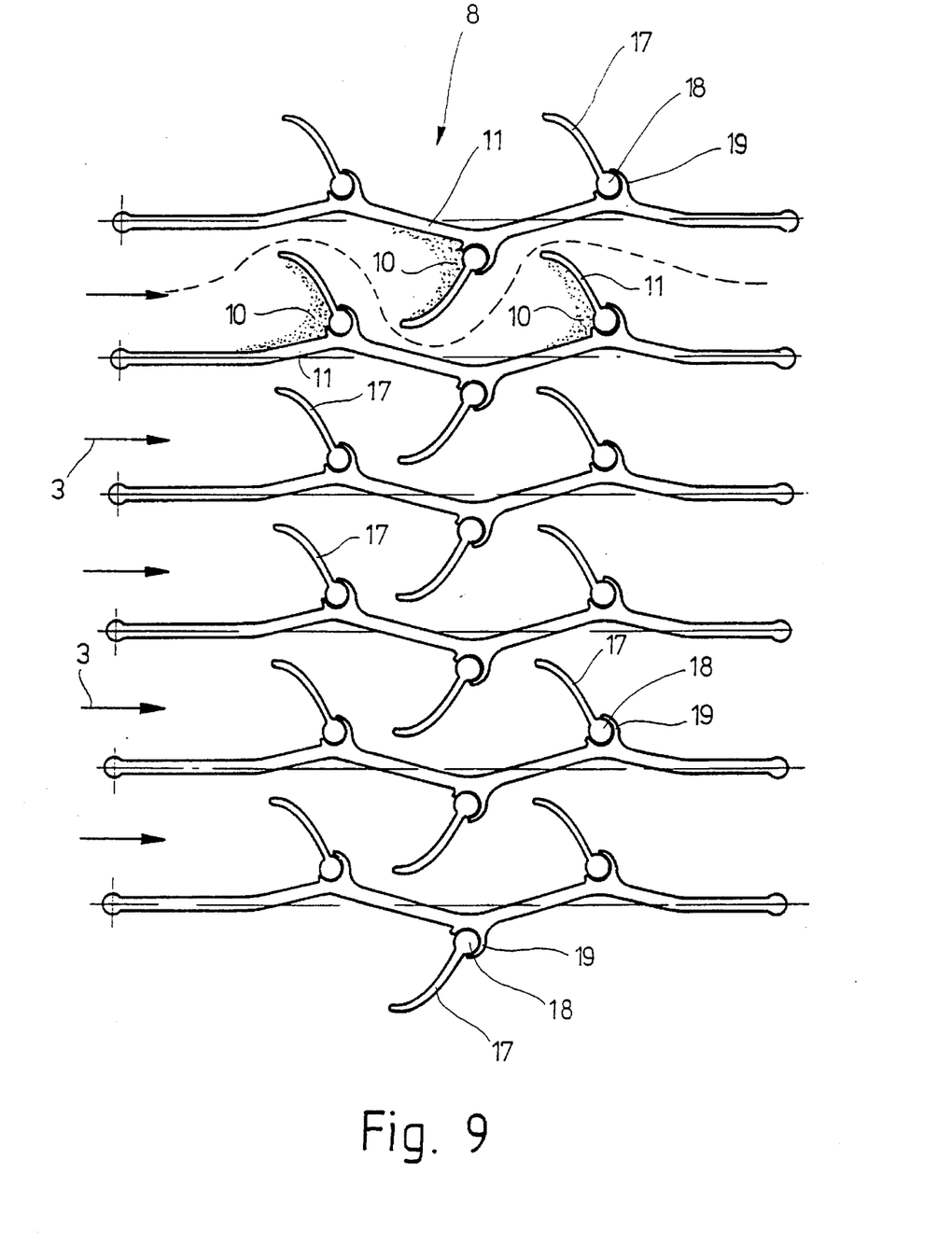
FIG. 9 shows the third embodiment of the moisture separator in the third position thereof.

FIGS. 7 to 9 show a final embodiment example of a liquid separator 8 with rib walls 9 which are arranged at a distance from one another. Foldable air flow displacement members 17 are arranged at both sides of the rib walls 9. The air flow displacement members 17 are constructed as guide vanes having, at their fastened end, a bead 18 which is approximately circular in cross section and is received in a bead cup 19 at the corresponding rib wall 9 so as to be movable in a swiveling manner. Accordingly, the air flow displacement members 17 can be spread apart from the actual rib wall 9 to a greater or lesser extent by means of a suitable adjusting device, not shown, so that the air path between the individual rib walls 90 is correspondingly narrowed and the air flow is deflected at a correspondingly different angle. The farther the air flow displacement members 17 are spread apart, the smaller the drops of the drop spectrum entrained by the air flow 3 which are separated.

All of the embodiment examples shown in the present application work according to the same principle. Liquid (water) is atomized by means of the liquid atomizing device 6 at high pressure so as to produce spectra of very small droplets. These small drops result in a very intensive mass transfer (evaporation) to the air flow 3, i.e. this air flow 3 is humidified to 100% relative humidity in spite of the fact that only a relatively small amount of water is supplied. As a result of the adjusting possibilities described in the various embodiment examples, the liquid separator 8 in question can be adjusted in accordance with the drop spectrum in question in such a way that an optimal separation of moisture occurs. The drop spectrum can be changed with the atomizing pressure. The higher the atomizing pressure of the liquid atomizing device 6, the smaller the droplets that are produced. In a corresponding manner, the water separator is adjusted according to the invention so as to achieve a degree of separation corresponding to the drop spectrum in question, i.e. the size of the spectrum of drops of water. Accordingly, the separator can be adapted to the small spectrum of drops which changes with various operating states. The separator can preferably be adjusted in such a way that extremely small drops from the high-pressure atomization pass through the separator. These drops are so small that they evaporate again in the duct system downstream of the humidifier without forming water precipitation at the inner walls of the duct (the ducts thus remain dry). Accordingly, given a constant air quantity, a substantially higher humidity output can be achieved. The operating pressure of the liquid atomizing device 6 can preferably range from 20 to 300 bar. As already mentioned, the drop spectrum changes depending on the adjusted nozzle pressure. The moisture separator 8 can be adjusted along with the latter in a corresponding manner manually or automatically by means of a suitable regulating device or control device.

We claim:

1. An air humidifier, comprising a chamber through which a stream of air flows; means for humidifying the air flowing through said chamber; and a water separator located downstream of said humidifying means for separating excess drops from the humidified air, said water separator comprising adjustable means determining a degree of separation of said water separator;

wherein said adjustable means comprises a stack of spaced rib walls for deflecting the humidified air flow onto respective portions of respective below-lying rib walls for separating the water drops from the humidified air flow;

wherein said rib walls have adjustable positions corresponding to different degrees of separation of said water separator; and wherein each of said rib walls is formed of at least two superimposed walls having substantially the same profile and separable from each other, at one end thereof, the adjustable positions of said rib walls being defined by a degree of separation of said two superimposed walls.

2. An air humidifier according to claim 1, wherein said adjustable means is adjusted to vary a size of water drops to be separated to thereby vary the degree of separation of said water separator.

3. An air humidifier according to claim 1, wherein at least one of said rib walls, in a direction of the humidified air flow, is formed of a plurality of portions angularly displaceable relative to one another for changing an adjustable position of said at least one of said rib walls.

4. An air humidifier according to claim 1, wherein said air humidifying means comprises a liquid atomizing device for producing water drops of different sizes, the degree of separation of said water separator being determined by the size of water drops produced by said atomizing device.

5. An air humidifier according to claim 4, wherein said liquid atomizing device is a high-pressure liquid atomizing device having an adjustable air pressure defining the size of the produced water drops.

6. An air humidifier, comprising a chamber through which a stream of air flows; means for humidifying the air flowing through said chamber; and a water separator located downstream of said humidifying means for separating excess drops from the humidified air, said water separator comprising adjustable means determining a degree of separation of said water separator;

wherein said adjustable means comprises a stack of spaced rib walls for deflecting the humidified air flow onto respective portions of respective below-lying rib walls for separating the water drops from the humidified air flow;

wherein said rib walls have adjustable positions corresponding to different degrees of separation of said water separator; and wherein at least one of said rib walls has at least one foldable air flow deflection member for deflecting the humidified air flow onto said at least one of said rib walls, a position of said deflecting member determining the degree of separation of said water separator.

* * * * *